United States Patent Office 2,795,634
Patented June 11, 1957

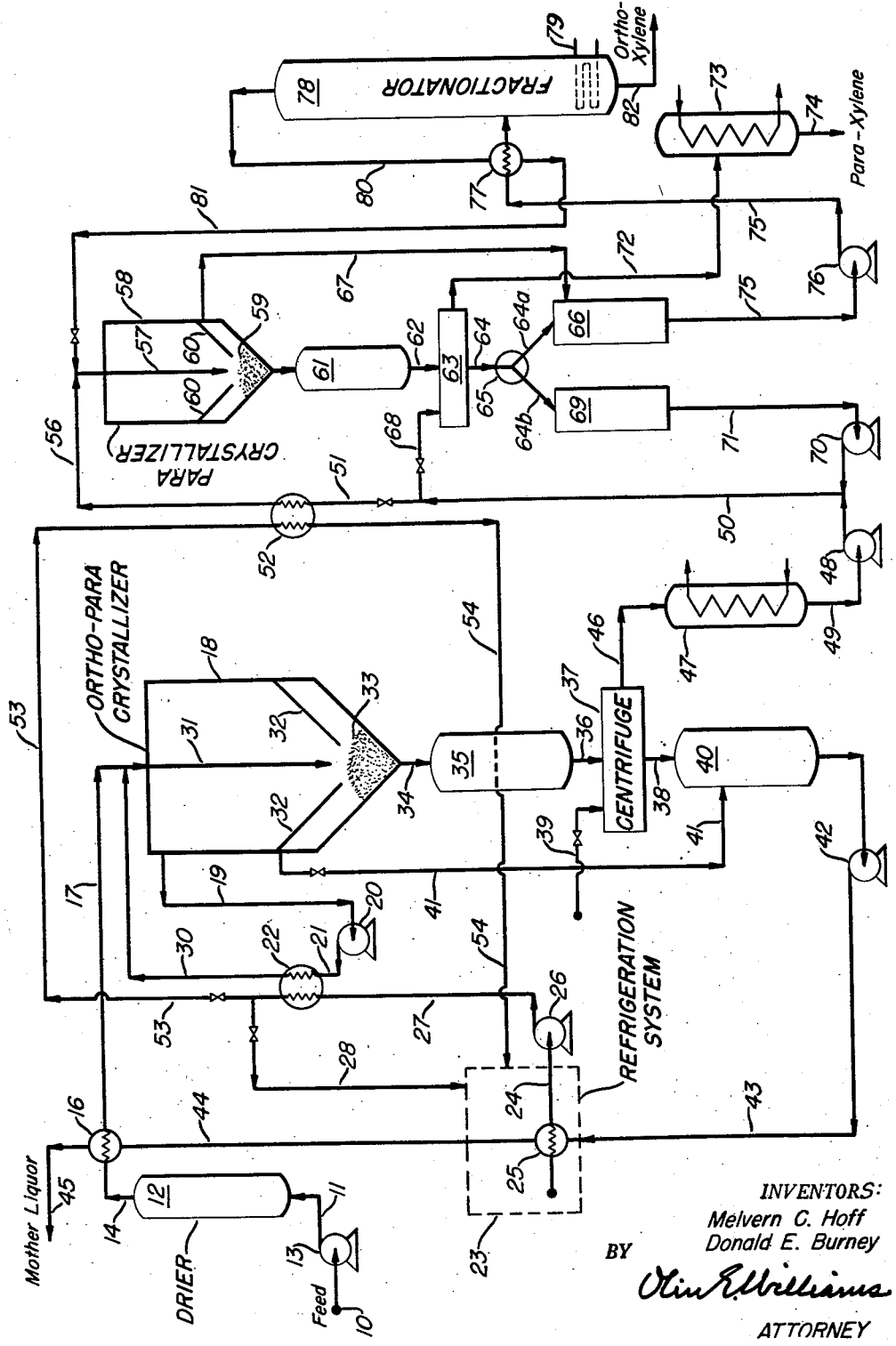

2,795,634

RECOVERY OF ORTHO- AND PARA-XYLENES FROM $C_8$ AROMATIC MIXTURES

Melvern C. Hoff, Highland, and Donald E. Burney, Griffith, Ind., assignors to Standard Oil Company, Chicago, Ill., a corporation of Indiana Application May 1, 1953, Serial No. 352,435

2 Claims. (Cl. 260—674)

This invention relates to a process of recovering and separating xylene isomers especially from a mixture of the same with ethylbenzene and paraffins boiling in substantially the same range. The invention has particular reference to a process for separating individual xylene isomers from each other and from such mixtures by fractional crystallization.

Xylenes are found in substantial quantities in coke oven light oil and certain virgin and reformed petroleum naphthas. A demand has developed in recent years for the separated individual isomers; for example, para-xylene is used in the manufacture of terephthalic acid and ortho-xylene in the manufacture of phthalic anhydride. Heretofore, the separation of each of the individual isomers has involved a combination of chemical and physical methods more suitable to the laboratory than to industrial use. Ortho-xylene has been separated from xylene mixtures by fractional distillation involving the use of a column of about 100 theoretical plates but nevertheless yielding an ortho-xylene concentrate which is contaminated with paraffins and the other isomers. Para-xylene has been separated from xylene mixtures from which ortho-xylene may or may not have been previously separated, by a fractional crystallization, in which process, however, only a limited portion of the para-xylene can be recovered, about 60% to 70% being the approximate yield even when full use of supercooling of other components was made.

An object of the present invention is to provide an improved method for the recovery of xylene isomers from crude mixtures of the isomers. Another object of the invention is the provision of an improved method for the recovery of ortho-xylene and, separately, para-xylene. A further object of the invention is the provision of an improved method for recovering an ortho-xylene of improved purity without the requirement of chemical purification steps. Other objects of the invention will be found in the specification and claims.

Briefly stated, the present invention comprises fractionally crystallizing para- and ortho-xylene from a crude xylene mixture by cooling it to a temperature in the range of spontaneous crystallization of the ortho- para-xylene eutectic, but not below, and preferably just above, the spontaneous crystallization temperature for any third component, e. g., meta-xylene, and subsequently separating so-crystallized ortho- and para-xylene by fractional distillation to recover as bottoms product a substantially pure ortho-xylene and an overhead fraction that is a concentrated para-xylene containing some ortho-xylene. Paraffins and ethylbenzene will be separated into the mother liquor produced by the fractional crystallization and consequently ortho-xylene obtained by the subsequent fractional distillation will be substantially free of these components. The crystallization of ortho- and para-xylene from the crude mixture prior to distillation can be accomplished in a single step or, preferably, para-xylene that is in excess of the para-xylene existing in the ortho- para-xylene eutectic mixture can be separated from the eutectic mixture prior to the distillation. The excess para-xylene can be separated as a first crop of crystals while in the course of cooling the entire crude mixture to the ultimate minimum temperature that is defined above. Alternatively, para-xylene can be recovered from the total separated para- ortho-xylene crystals by a solids-liquid fractionation which includes melting crystal cake and then cooling to a temperature between about —32° and —38° C. to crystallize the excess para-xylene. If the excess para-xylene is separated first, the overhead from the subsequent fractional distillation will be returned to this first crystallization step; if the para-xylene is separated from the total para- ortho-xylene crystals, then the overhead from the subsequent fractional distillation will be recycled to the second crystallization step. In other words, the distillation overhead will always be returned to the crystallization step in which excess para-xylene is separated.

The impure xylenes-containing material that is fed to the present process should contain at least about 10% of para-xylene and about 10% or more of ortho-xylene. The feed stock will also contain paraffins and ethylbenzene, the paraffins in small proportion, usually less than between about 10% to 15%, and the ethylbenzene in a proportion that is usually greater than 10% and often as high as 20% or more. The product of hydroforming, a typical aromatizing petroleum-reforming process, will contain the para-, ortho-, and meta-xylene isomers in a thermodynamic equilibrium mol ratio, respectively, of about 2:3:5, or in another instance 2:2:6. These hydroformer fractions will contain in addition ethylbenzene and nonaromatics.

In the recovery of the individual pure isomers from crude xylene mixtures having the usual or normal distribution of isomers, the xylenes fraction should be cooled to a temperature between about —90° and —110° C., and preferably to about —100° C., to recover substantially all of the para-xylene in excess of its proportion in the ortho-para binary eutectic, and in addition, the para- and ortho-xylene in the ortho- para-xylene eutectic mixture. While the temperature range stated above will be an accurate guide for the crystallization of para-xylene and para-ortho- eutectic from hydroformer mixtures, a large variation in the relative amount of ethyl-benzene and paraffins will alter this temperature. The temperature can be determined experimentally for any particular feed composition. A xylenes fraction that for example has been $SO_2$-extracted may contain only about 1% paraffins, and its ethylbenzene content may vary to some extent depending upon the nature of the source of crude oil. Upon cooling a xylenes fraction para-xylene, in the thermodynamic distribution of xylene isomers substantially always encountered, will be first saturated, will first crystallize and can be separated prior to further cooling. The fraction can then be cooled to the point at which the mother liquor becomes saturated with ortho-xylene, after which a eutectic mixture of para- and ortho-xylene will crystallize. Crystallization of the binary eutectic is then continued until the mother liquor becomes saturated with meta-xylene and it may be continued until the mother liquor becomes so supersaturated that the spontaneous crystallization temperature of meta-xylene is approached.

A maximum yield of para-xylene is ultimately recoverable by our method, since crystallization of the para-xylene can be continued to below the ortho-xylene spontaneous crystallization temperature and down to the spontaneous crystallization temperature of meta-xylene, and since the meta-xylene shows a pronounced tendency to supercool (cf. Kravchenko, Acta Phys., U. S. S. R., 20, p. 567), the amount of para-xylene ultimately recoverable is even greater than the excess of para-xylene over and above the amount existing in the ortho-para-meta ternary eutectic.

When both excess para-xylene and para- ortho-xylene eutectic are separated in a single crystallization step (the selected procedure hereinafter described), the crystals can be subjected to fractional melting in which procedure they are warmed to a temperature of about —38° to —32° C. and the resultant slurry is centrifuged. The melted portion acts as a wash during centrifuging. The melt, or mother liquor, is then fractionally distilled for separation of substantially pure ortho-xylene. The para-xylene in excess of the binary eutectic mixture can also be separated by first melting crystals from the first crystallization step and then cooling to a temperature between about —32° and —38° C. This second crystallization step, later described in detail, can employ any one of several cooling fluids. For example, refrigerant which has been employed in cooling the feed to the first crystallization can be used. Mother liquor from the first crystallization step is also suitable. Mother liquor from the second or para-xylene crystallization step will consist of substantially only an eutectic mixture of para- and ortho-xylene, in which the xylenes are present in a ratio of respectively about 1:3. Ortho-xylene is separated from this mother liquor by a fractional distillation in which ortho-xylene is recovered as a bottoms product and a para-xylene concentrate is carried overhead. The ortho-xylene is recovered substantially free of paraffins since it is obtained from a mixture of xylene crystals. The ortho-xylene is substantially free of para-xylene since the distillation can be so performed as to carry a portion of the ortho-xylene overhead. The ortho-xylene that is carried overhead is not lost since it is recycled in the para-xylene concentrate to the second crystallization zone and, when equilibrium conditions are reached, the amount of ortho-xylene that is recovered as a bottoms product will be substantially equivalent to the amount introduced into the second crystallization step.

The mother liquor recovered from the first crystallization step will contain substantially all of the meta-xylene of the feed stock and all of the ethylbenzene in admixture with paraffins and minor amounts of other contaminants. While this mother liquor is useful, in addition to being a valuable fuel, as a solvent and is further marketable because of its high ethylbenzene content, it can be further treated for the recovery of ethylbenzene and/or meta-xylene. The mother liquor, in the crystallization of meta-xylene, should be seeded with meta-xylene crystals since this isomer has a strong tendency to supercool. The meta-xylene will substantially always be present in the mother liquor from the first crystallization step in supersaturated condition and, consequently, seeding the liquor will precipitately crystallize a large proportion of the meta-xylene. The liquor is especially suitable for known chemical means of separating either the meta-xylene or the ethylbenzene. The ethylbenzene, for example, can be recovered by a hydrogenation-dehydrogenation process of the type disclosed in Matton U. S. 2,282,231.

In the accompanying patent drawing, which is supplied for the purpose only of illustrating the invention, the single figure is a schematic flow diagram of a process for the recovery of the separate xylene isomers by a preferred method of the present invention in which both para- and ortho-xylene is first separated from feed stock prior to other fractional crystallization and distillation steps.

A crude xylenes hydroformer fraction containing by volume about 17% ortho-xylene, 33% meta-xylene, 12% para-xylene, 24% ethylbenzene, 10% paraffins and 2 to 3% toluene and $C_9$ aromatics, is fed from a source 10 through line 11 and is pumped into drier 12 by pump 13 disposed in the line 11. Drier 12 can represent a bank of driers and can be, for example, about 3.7 feet in diameter and contain a calcium chloride bed about 10 feet high. The feed stock is pumped through the drier 12 at a temperature of about 38° C. and at a rate, in this example, of about 3200 gallons per hour. Dried feed flows from the drier 12 through line 14 and heat exchanger 16 in which the feed is cooled by indirect contact with mother liquor to a temperature of about —50° C. Cooled fresh feed is flowed to the exchanger through line 17 into a continuous crystallizer 18. The contents of crystallizer 18 are withdrawn through line 19 by pump 20 and are passed by the pump 20 through line 21 into cooler 22 in which the recycle material is cooled to a temperature of about —100° C. Material from the crystallizer 18 is recycled at a rate of about 320,000 gallons per hour or at a recycle ratio of approximately 100 to 1.

The cooler 22 is a conventional cooling means which may well include a bank of several tube coolers, or the like. Cooling is effected by a liquid refrigerant which flows from a refrigeration system indicated at 23 through a line 24 in which is disposed a heat exchanger 25 wherein the liquid is cooled by mother liquor flowing from the crystallizer 18. The refrigerant liquid is then pumped from line 24 by pump 26, through line 27 into the cooler 22 in which the recycled xylenes mixture is cooled as before described. The refrigerant is introduced into the cooler 22 at a temperature of about —105° C. The cooling system has a capacity of about 800,000 B. t. u. per hour. Cooling liquid flows out of cooler 22 and returns by way of valved line 28 into the refrigeration system 23.

Cooled xylenes mixture flows from the cooler 22 through line 30 to the crystallizer 18, and is introduced therein, in admixture with fresh feed, by means of tube 31 which extends along the central vertical axis of the crystallizer to an intermediate point therein. The crystallizer contains baffles 32 which slant downward from the walls to a central opening through which xylene crystals, settling on the baffles, are directed. The crystals accumulate in the lower baffled section 33 of the crystallizer 18. In a cylindrical crystallizer, baffles 32 can constitute a single inverted hollow truncated cone.

The crystallizer 18, which may be an Oslo-type crystallizer, effects some classification of crystals through the fact that the liquid in the crystallizer will pass upwardly at a greater rate than the crystals, and as the crystals fall through the mother liquor they will tend to grow. This will accelerate the descent of the crystals to the baffled section 33. Some crystals and mother liquor from the crystallizer 18 will pass through the line 19 in the described recycle. The crystallizer 18 is operated at a temperature of about —100° C. and the xylenes fraction flows through the crystallizer in about 5 to 10 minutes. The crystallizing mixture in the crystallizer flows out of tube 31 and upwardly at a velocity of about 2.9 feet per minute. The temperature and time lag in the crystallizer are such that all of the excess para-xylene and substantially the entire amount of para-ortho eutectic mixture are crystallized from the mother liquor.

Crystal magma from the crystallizer 18 will pass through line 34 at a rate of about 3200 gallons per hour into a magma surge drum 35 and will be intermittently charged from the drum 35 through a line 36 into a continuously operated centrifuge 37. Centrifuge 37 may be representative of a series of centrifuges to which crystal magma is directed for separation and recovery of the mixed crystals. The crystals can be washed in the centrifuge 37 by wash liquor directed therein through valve line 39. The source of wash liquor flowing through valve line 39 can be either fresh feed or a liquid melt of a portion of crystals that have been separated in the centrifuge 37 or even extraneous solvents such as toluene can be employed to remove the absorbed layer of mother liquor from the crystals.

Mother liquor which has been separated in the centrifuge 37 flows through a line 38 into a mother liquor surge drum 40. Mother liquor that separates from the xylenes mixture in the portion of the crystallizer 18 which lies in section 33 beneath the baffles 32 flows through valve line 41 into surge drum 40. Mother liquor, which contains meta-xylene, ethylbenzene and paraffins in substantial amount, is flowed from the surge drum 40 and is pumped by pump 42 through line 43, heat exchanger 25, line 44, heat exchanger 16, and outlet line 45 to means for the recovery of meta-xylene or utilization of other components of the mother liquor.

Mixed xylene crystals from centrifuge 37 are passed by line 46 through a heater 47 in which the crystal slurry is warmed. The mixed-crystal slurry is pumped by pump 48 through a line 49 and valved lines 50 and 51 into a cooler 52 in which the melt is cooled to a temperature of about −33° C. The cooler 52 operates by the indirect heat exchange of slurry with a cooling fluid flowing from line 27 through valved line 53 into cooler 52 at a rate of about 750 gallons per hour. The cooled liquid flows from the cooler 52 in a line 54 through which it is returned to the refrigeration system 23. Mother liquor, for example that which is removed from crystallizer 18 through line 41, can also be used as the cooling medium in cooler 52.

The slurry which has been cooled to a temperature of about −33° C. flows from the cooler 52 through a line 56 and injector pipe 57 into a second crystallizer 58.

The ortho-para-xylene mixture is maintained in the crystallizer 58 at a temperature of −33° C. for a period of sufficient duration, for example, 5 to 20 minutes, to effect a crystallization of the excess para-xylene over that portion in the eutectic mixture with ortho-xylene. Crystal growth occurs and some settling is effected in a manner similar to the operation of crystallizer 18. For purposes of simplicity, no internal refluxing of crystal magma directly from the crystallizer 58 through the cooler 52 is shown; but preferred operation may include such a recycle. Crystal magma which has settled in the crystallizer 58 into the section 59 beneath the baffles 60 is flowed from the crystallizer to a magma surge drum 61 from which magma is intermittently charged through line 62 into continuous centrifuge 63.

Centrifuge 63, which can represent a bank of centrifuges, separates mother liquor from the crystal magma, and then, in subsequent timed stages, separates at least one wash liquid from the crystals. Mother liquor is flowed from the centrifuge 63 through line 64 and by means of two-way valve 65 is directed through line 64a to a mother liquor surge drum 66 at a rate of about 520 gallons per hour. Mother liquor can also be recovered from a point beneath the baffles 60 in section 59 of the crystallizer 58 and be flowed through line 67 into the mother liquor surge drum 66.

The para-xylene that is separated in centrifuge 63 is washed with a portion of the feed to the crystallizer 58. This melted xylenes-liquid is flowed from valved line 50 through valved line 68 into the centrifuge 63. Wash liquid is withdrawn from the centrifuge through lines 64 and is directed by two-way valve 65 through line 64b into a wash-liquid surge drum 69 from which wash liquid is pumped by a pump 70 through a line 71 into valved line 50, whereby the wash liquid is recycled to the second crystallizer 58.

Para-xylene which is separated from mother liquor in the centrifuge 63 is passed by line 72 into a heater 73 in which the para-xylene crystals are melted. The para-xylene melt can be passed from the heater 73 through a line 74 to storage or further purification means (not shown). A portion of the melted para-xylene may be used in washing the para-xylene in centrifuge 63 whereby not only a slight melting of the para-xylene is accomplished but also the washing action is used to further purify the crystals. This para-xylene wash liquid will be recycled through line 64b and lines 50, 51 and 56 to the crystallizer 58.

Mother liquor from the mother liquor surge drum 66 is pumped through line 75 by pump 76 disposed therein to a heat exchanger 77 and flows at a rate of about 550 gallons per hour into a mid-section of continuous fractionator 78. Mother liquor as introduced into the fractionator will contain ortho-xylene and para-xylene in approximately the eutectic ratio, e. g., about 1 part of para-xylene to 3 parts of ortho-xylene. The fractionator will be operated by means of reboiler 79 at a temperature and heat input rate such that para-xylene and a small portion of ortho-xylene is carried as vapor overhead. Distillate flows through line 80, heat exchanger 77 and valved line 81 into crystallizer 58 for the recovery of the high para-xylene content of this overhead fraction.

Substantially pure ortho-xylene is withdrawn from the fractionator 78 through an outlet line 82 at a rate of about 400 gallons per hour, which is equivalent to about 68 percent recovery of the theoretical amount of ortho-xylene in the feed. This ortho-xylene is remarkably free of contaminants, since the double treatment of distillation and fractionation has combined to eliminate substantially all of the other components of the feed, paraffins, ethylbenzene and meta-xylene having been eliminated by the first crystallization step and para-xylene by the fractionating column.

Our process, as compared to known processes in which orthoxylene is recovered by a fractional distillation of the xylene feed prior to any crystallization, reduces the relative volume of feed which must be distilled overhead from about 85 percent to less than 10 percent, and the total amount of the xylene mixture which must be distilled is reduced to about 20 percent. Ortha-xylene comprises usually only about 10 to 25 percent of crude xylene fractions but the feed to our distillation column contains about 75 percent ortho-xylene. Consequently, our process will require a distillation column only about 1/12 to 1/15 the size required for distillation of crude fractions. Our process recovers para-xylene in improved yield and in a purity of 95 to 97 percent. Ortho-xylene is recovered in a purity of 95 percent or better.

Having described our invention, we claim:

1. A method of separating para-xylene and ortho-xylene each in refined form from a crude mixture of the xylene isomers, ethylbenzene and paraffins boiling substantially within the boiling temperature range of the xylene isomers, the said method comprising cooling the crude mixture to a temperature that is just above the spontaneous crystallization temperature of the first saturated component of the mixture other than para-xylene and ortho-xylene to effect crystallization of para-xylene and ortho-xylene, separating so-obtained para-and ortho-xylene crystals from resultant mother liquor, recovering substantially pure para-xylene as a product from the para- and ortho-xylene crystals by a second crystallization, fractionally distilling the mother liquor from the second crystallization so as to recover a para-xylene rich distillate and a substantially pure ortho-xylene bottoms product and recycling the para-xylene-rich distillate to the second crystallization.

2. A method for the recovery and separation in a purified form of para-xylene and ortho-xylene from a crude mixture thereof containing at least 10 percent each of ortho- and para-xylene and also meta-xylene, ethylbenzene and paraffins boiling within substantially the xylenes boiling range which method comprises cooling the crude mixture to a temperature that is between about −90° and −110° C. and is just above the spontaneous crystallization temperature of meta-xylene, and thereby crystallizing substantially all the para-xylene and ortho-xylene in their binary eutectic mixture and the para-xylene present in excess thereof; separating the crystal mixture from the resultant mother liquor and withdrawing mother liquor as a product; washing the crystal mixture with a wash liquid to remove absorbed mother liquor; melting the crystal mixture; cooling the melt to a temperature that is between about −32° and −38° C. and is just above the crystallization temperature of ortho-xylene in the melt and thereby crystallizing para-xylene; separating the para-xylene crystals from mother liquor of the second crystallization step; melting a portion of the separated para-xylene crystals and washing a further produced portion of para-xylene with the para-xylene melt; distilling the mother liquor from the second crystallization step to recover a para-xylene concentrate overhead and a substantially pure ortho-xylene bottoms product; withdrawing the ortho-xylene as a product; and recycling the overhead para-xylene concentrate to the second crystallization step.

References Cited in the file of this patent

UNITED STATES PATENTS

| | | |
|---|---|---|
| 2,398,526 | Greenburg | Apr. 16, 1946 |
| 2,541,682 | Arnold | Feb. 13, 1951 |
| 2,622,115 | Carney | Dec. 16, 1951 |

OTHER REFERENCES

Kravchenko: J. Phys. Chem. U. S. S. R., vol. 15, pp. 652–8 (1941). Abstracted in Chem. Abs., vol. 36, p. 4016[6] (1942).

Kravchenko: Acta Physico Chim. U. S. S. R., vol. 20, pp. 566–77 (1945). Abstracted in Chem. Abs. vol. 40, p. 4283[8] (1946).